US012353833B2

(12) United States Patent
Hou et al.

(10) Patent No.: US 12,353,833 B2
(45) Date of Patent: *Jul. 8, 2025

(54) CONVERSATIONAL DATA ANALYSIS

(71) Applicant: Microsoft Technology Licensing, LLC, Redmond, WA (US)

(72) Inventors: Zhitao Hou, Redmond, WA (US); Jian-Guang Lou, Redmond, WA (US); Bo Zhang, Redmond, WA (US); Xiao Liang, Redmond, WA (US); Dongmei Zhang, Redmond, WA (US); Haidong Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

This patent is subject to a terminal disclaimer.

(21) Appl. No.: 17/813,435

(22) Filed: Jul. 19, 2022

(65) Prior Publication Data

US 2022/0405479 A1  Dec. 22, 2022

Related U.S. Application Data

(63) Continuation of application No. 16/338,061, filed as application No. PCT/US2017/052839 on Sep. 22, 2017, now Pat. No. 11,423,229.

(30) Foreign Application Priority Data

Sep. 29, 2016 (CN) .......................... 201610867019.5

(51) Int. Cl.
*G06F 40/30* (2020.01)
*G06F 16/26* (2019.01)
(Continued)

(52) U.S. Cl.
CPC .............. *G06F 40/30* (2020.01); *G06F 16/26* (2019.01); *G06F 16/3329* (2019.01); *G06F 16/36* (2019.01)

(58) Field of Classification Search
CPC ...... G06F 16/26; G06F 16/36; G06F 16/3329; G06F 40/30
See application file for complete search history.

(56) References Cited

U.S. PATENT DOCUMENTS 9,292,577 B2 * 3/2016 Friedlander ....... G06F 16/24575
2008/0017722 A1  1/2008 Snyder et al.
(Continued)

FOREIGN PATENT DOCUMENTS

CN     101124578 A    2/2008
CN     101364229 A    2/2009
(Continued)

OTHER PUBLICATIONS

"Office Action Issued in Chinese Patent Application No. 201610867019.5", Mailed Date: Jun. 16, 2022, 18 Pages.
(Continued)

*Primary Examiner* — Eric Yen

(57) ABSTRACT

Implementations of the subject matter described herein relate to conversational data analysis. After a data analysis request is received from a user, heuristic information may be determined based on the data analysis request. The heuristic information mentioned here is not a result for the data analysis request but information which may be used for leading the conversation to proceed. Based on such heuristic information, the user may provide supplementary information associated with the data analysis request, for example, clarify meaning of the data analysis request, submit a relevant further analysis request, and so on. A really desired and meaningful data analysis result can be provided to the user according to the supplementary information provided (Continued)

by the user. Thus, data analysis will become more accurate and effective. While obtaining really helpful information, the user also gains good user experience.

20 Claims, 9 Drawing Sheets

(51) Int. Cl.
*G06F 16/3329* (2025.01)
*G06F 16/36* (2019.01)

(56) References Cited

U.S. PATENT DOCUMENTS

| | | | |
|---|---|---|---|
| 2014/0278438 A1* | 9/2014 | Hart | G06F 3/167 |
| | | | 704/275 |
| 2017/0075953 A1* | 3/2017 | Bozkaya | G06F 16/24522 |
| 2017/0371608 A1* | 12/2017 | Wasserman | G07C 5/008 |
| 2018/0005149 A1* | 1/2018 | Dhingra | G06Q 10/0633 |

FOREIGN PATENT DOCUMENTS

| | | |
|---|---|---|
| CN | 103295148 A | 9/2013 |
| CN | 104077347 A | 10/2014 |

OTHER PUBLICATIONS

"Notice of Allowance and Search Report Issued in Chinese Patent Application No. 201610867019.5", Mailed Date: Oct. 17, 2022, 9 Pages.

Gilbert, et al., "Tools for Analyzing Qualitative Data: The History and Relevance of Qualitative Data Analysis Software", In Handbook of Research on Educational Communications and Technology, Jan. 1, 2013, pp. 221-236.

Kiong, et al., "Research on Big Data Technology for Small and Micro Business of Commercial Banks", In Business Management of Commercial Banks, Sep. 10, 2016, pp. 53-55.

* cited by examiner

200

| COUNTRY (210) | GENDER (220) | FATALITY (230) | ACTIVITY (240) | ATTACKS (250) | YEAR (260) |
|---|---|---|---|---|---|
| AUSTRALIA | FEMALE | NON FATAL | WADING | 1 | 1914 |
| AUSTRALIA | FEMALE | (BLANK) | SWIMMING | 1 | 1916 |
| AUSTRALIA | FEMALE | NON FATAL | BATHING | 1 | 1924 |
| AUSTRALIA | FEMALE | FATAL | SWIMMING | 1 | 1926 |
| AUSTRALIA | FEMALE | NON FATAL | BATHING | 1 | 1929 |
| AUSTRALIA | FEMALE | FATAL | BATHING | 1 | 1934 |
| AUSTRALIA | FEMALE | NON FATAL | OTHER | 1 | 1934 |
| AUSTRALIA | FEMALE | NON FATAL | OTHER | 1 | 1936 |
| AUSTRALIA | FEMALE | FATAL | SWIMMING | 1 | 1942 |
| AUSTRALIA | FEMALE | FATAL | WADING | 1 | 1942 |
| AUSTRALIA | FEMALE | FATAL | OTHER | 1 | 1943 |
| AUSTRALIA | FEMALE | FATAL | SWIMMING | 1 | 1946 |
| AUSTRALIA | FEMALE | NON FATAL | BATHING | 1 | 1949 |
| AUSTRALIA | FEMALE | NON FATAL | SPEARFISHING | 1 | 1960 |
| AUSTRALIA | FEMALE | NON FATAL | WADING | 1 | 1961 |
| AUSTRALIA | FEMALE | FATAL | WADING | 1 | 1961 |
| AUSTRALIA | FEMALE | FATAL | WADING | 1 | 1963 |
| AUSTRALIA | FEMALE | NON FATAL | SWIMMING | 1 | 1968 |
| AUSTRALIA | FEMALE | NON FATAL | OTHER | 1 | 1972 |
| AUSTRALIA | FEMALE | NON FATAL | OTHER | 1 | 1975 |
| AUSTRALIA | FEMALE | NON FATAL | OTHER | 1 | 1976 |
| AUSTRALIA | FEMALE | NON FATAL | OTHER | 1 | 1976 |
| AUSTRALIA | FEMALE | FATAL | SWIMMING | 1 | 1983 |
| AUSTRALIA | FEMALE | FATAL | DIVING | 1 | 1985 |

Fig 2

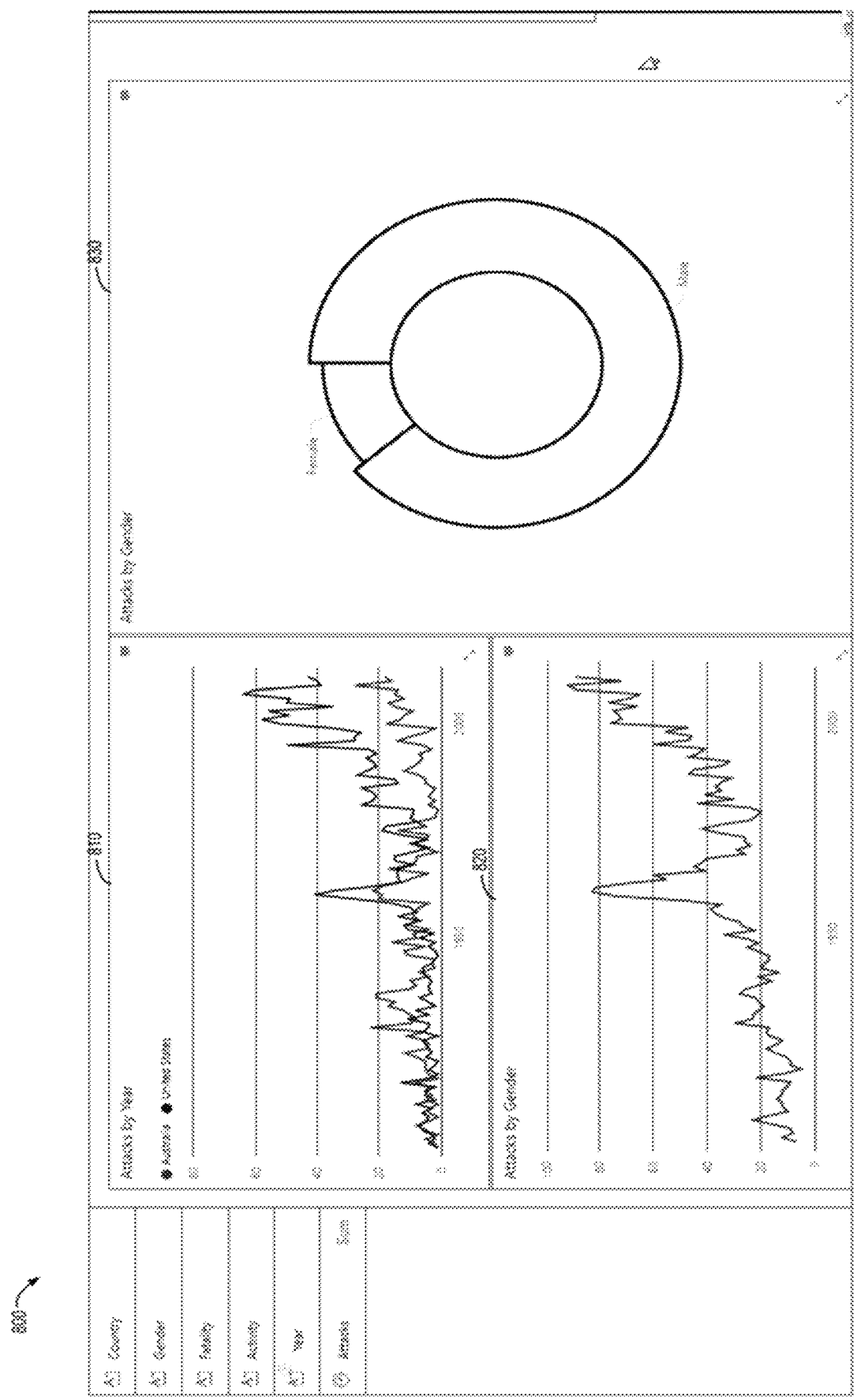

CONVERSATIONAL DATA ANALYSIS

CROSS-REFERENCE TO RELATED APPLICATIONS

This application is a continuation of U.S. Ser. No. 16/338,061 filed on Mar. 29, 2019, which is a U.S. National Stage Application of PCT/US2017/052839, filed Sep. 22, 2017, which claims benefit of Chinese Patent Application No. 201610867019.5, filed Sep. 29, 2016, and which applications are hereby incorporated by reference. To the extent appropriate, a claim of priority is made to each of the above disclosed applications.

BACKGROUND

Data analysis plays an important role in many application areas such as data-driven decision making systems. A user may submit data queries to data analysis tools so as to query data and create visualization reports from desired perspectives. To make data analysis more convenient and usable, solutions have been proposed for applying natural language processing to user interfaces for data analysis. Natural language processing refers to the technology processing human languages by means of computers, which enables computers to understand human languages.

Conventionally, natural language processing based data analysis solutions are mainly based on single input box. Upon receipt of a data analysis request inputted by a user in the form of natural language, a machine performs corresponding operations and provides a result accordingly. For a simple or basic data analysis request, such data analysis solutions usually can obtain corresponding data analysis results. However, for a complex data analysis request, it is difficult for conventional data analysis solutions to understand the user's true intention correctly, let alone provide data analysis results needed by the user.

SUMMARY

To solve the above and potential problems, embodiments of the subject matter described herein provide a method and device for bi-directional conversational data analysis. According to the embodiments of the subject matter described herein, a user may make a data analysis request in a conversation with a machine. Upon receipt of the data analysis request from the user, heuristic information may be determined based on the data analysis request. The heuristic information discussed here is not a result for the data analysis request but information which may be used for leading the conversation to proceed. The user may provide, based on the heuristic information, supplementary information associated with the data analysis request, for example, clarifying meaning of the data analysis request, submitting a relevant further analysis request, and so on. A really desired and meaningful data analysis result can be provided to the user according to the supplementary information from the user. In this way, data analysis will become more accurate and effective. As a result, the user can gain good user experience while obtaining really helpful information.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

Through the more detailed description in the accompanying drawings, the above and other features, advantages and aspects of the subject matter described herein will become more apparent, wherein the same or similar reference numerals refer to the same or similar elements.

FIG. 2 shows a schematic diagram of a dataset 200 for data analysis according to an embodiment of the subject matter described herein;

FIG. 8 shows a user interface 800 according to an embodiment of the subject matter described herein.

Throughout the figures, same or similar reference numbers will always indicate same or similar elements.

DETAILED DESCRIPTION

Figure 1:
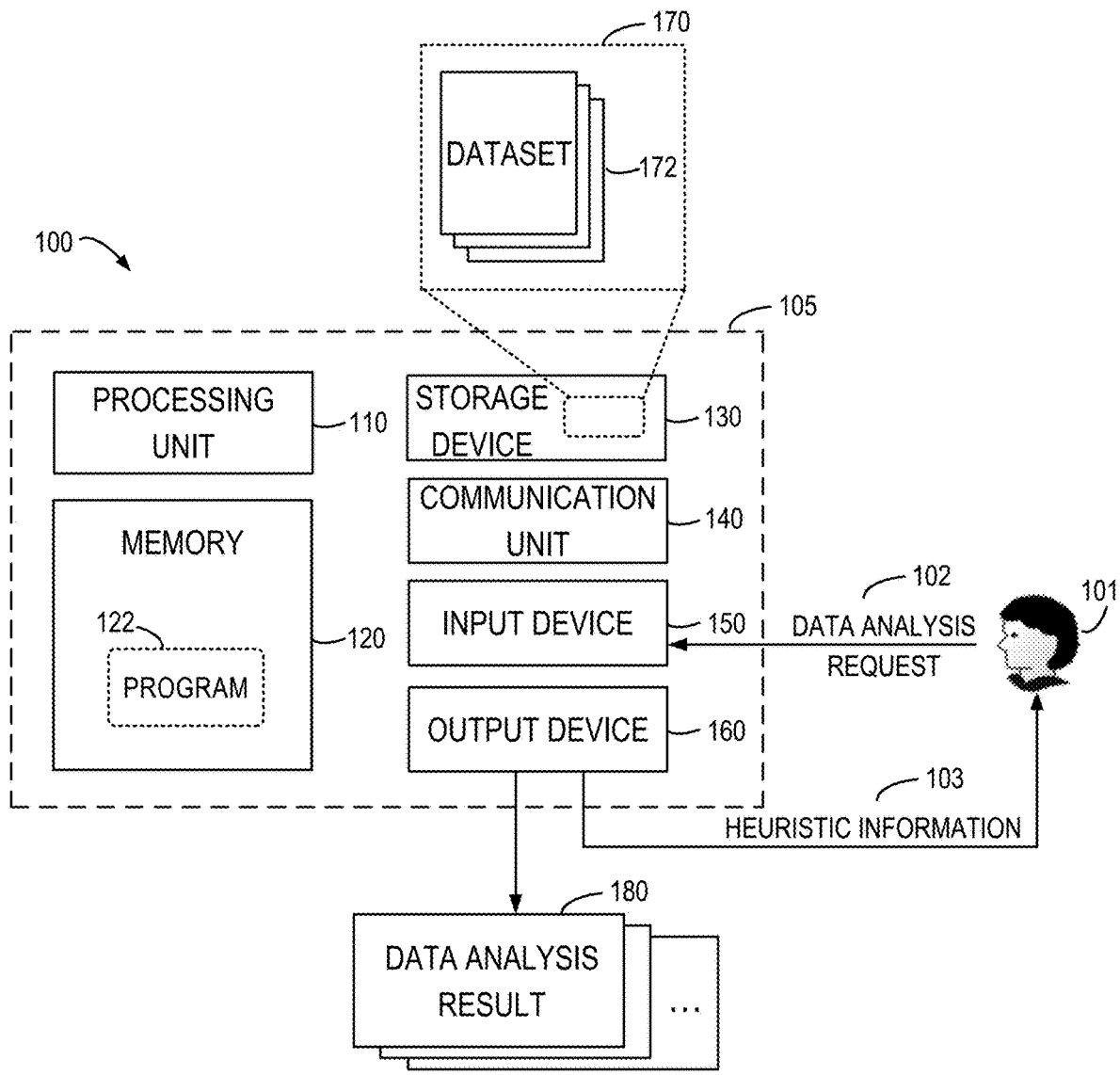
FIG. 1 shows a block diagram of a computing environment 100 in which one or more embodiments of the subject matter described herein can be implemented.

Embodiments of the subject matter described herein will be described in more detail with reference to the accompanying drawings, in which some embodiments of the subject matter described herein have been illustrated. However, the subject matter described herein can be implemented in various manners, and thus should not be construed to be limited to the embodiments disclosed herein. On the contrary, those embodiments are provided for the thorough and complete understanding of the subject matter described herein, and completely conveying the scope of the subject matter described herein to those skilled in the art. It should be understood that the accompanying drawings and embodiments of the subject matter described herein are merely for the illustration purpose, rather than limiting the protection scope of the subject matter described herein.

Generally, "data analysis" discussed in embodiments of the subject matter described herein refers to a process of using appropriate statistical analysis methods to analyze a large amount of collected data (hereinafter referred to as "datasets" for short), extract useful information and draw conclusions so as to study and summarize data in detail.

The term "heuristic information" used by embodiments of the subject matter described herein refers to information used for leading a conservation between users and a data analysis device, such as information for leading users to clarify a data analysis request, information for providing an extended data analysis result to users, and so on. Heuristic information is different from a result that is generated with respect to a user's data analysis request (hereinafter referred to as "data analysis result" for short).

The term "content item" used by embodiments of the subject matter described herein refers to a semantic unit used for characterizing data in a dataset, such as a word or a phrase about location, time, date, event, brand, category and so on.

The term "code segment" used by embodiments of the subject matter described herein refers to a segment of codes used for performing one or more operations associated with a content item. If the segment of codes is run using a content item as input, resultant output may be used as part or all of results for a data analysis request.

The term "include" and its variants used in embodiments of the subject matter described herein are to be read as open terms that mean "include, but is not limited to." The term "based on" is to be read as "based at least in part on." The terms "one embodiment" and "an implementation" are to be read as "at least one embodiment." The term "another embodiment" is to be read as "at least one other embodiment." Definitions of other terms will be presented in description below.

Traditionally, data analysis solutions use a unidirectional conversation pattern, which can only provide data analysis results with respect to simple or basic data analysis requests. When a user inputs a complex data analysis request, conventional data analysis solutions can hardly understand such a complex data analysis request, resulting in systems report errors or give a wrong data analysis result. In consequence, traditional data analysis solutions fail to provide the user the data analysis result he/she really wants, not to mention satisfy the user's needs. As a result, data analysis is meaningless.

To this end, the subject matter described herein proposes a bi-directional conversational data analysis method and device, which can not only receive a data analysis request from a user but also generate heuristic information by analyzing the data analysis request. The term "heuristic information" used here refers to information for leading a data analysis conversation to proceed, and is not a data analysis result. For example, the heuristic information may lead the user to make further explanations or supplements, thereby a question that is understandable to the device can be composed. Heuristic information may also be extended information related to the user's current analysis, which is proactively recommended to the user by the data analysis device. The extended information may be, for example, obtained from analyzed data by the data analysis device with data mining methods. In this manner, the method and device according to the embodiments of the subject matter described herein can provide the user with a data analysis result that better satisfies the user's needs, thereby significantly improving user experience.

With reference to FIGS. 1 to 8, illustration is presented below to basic principles and several exemplary implementations of the subject matter described herein. FIG. 1 shows a block diagram illustrating a computing environment 100 of a data analysis device in which the embodiments of the subject matter described herein can be implemented. It understood that computing environment 100 shown in FIG. 1 is merely illustrative and does not form any limitation to the functionality and scope of the embodiments described herein.

As shown in FIG. 1, the computing environment 100 includes a user 101 and a computing system/server 105 in the form of a general-purpose computing device. Computing system/server 105 may be used for implementing a data analysis device according to embodiments of the subject matter described herein (hereinafter referred to as "data analysis device 105"). The user 101 may interact with computing system/server 105 to submit a data analysis request 102 and obtain a data analysis result 180. Components of computing system/server 105 may include, but not limited to, one or more processors or processing units 110, a memory 120, a storage device 130, one or more communication units 140, one or more input devices 150 as well as one or more output devices 160. The processing unit 110 may be a real or virtual processor and can execute various processing according to programs stored in the memory 120. In a multi-processor system, multiple processing units concurrently execute computer executable instructions so as to increase the concurrent processing capability of the computing system/server 105.

The computing system/server 105 usually includes a plurality of computer storage media. Such media may be any available media that are accessible to the computing system/server 105, including, but not limited to, volatile and non-volatile media, removable and non-removable media. The memory 120 may be a volatile memory (e.g., register, cache, RAM), non-volatile memory (e.g., ROM, EEPROM, flash memory), or some combination thereof. The storage device 130 may be removable or non-removable media, and may include machine readable media, such as flash drivers, magnetic disks or any other media, which can be used for storing information and/or data 170 (e.g., a dataset 172) and which can be accessed within the computing system/server 105. It should be understood that the foregoing description is merely exemplary, and the dataset 172 can be not only stored in the storage device 130 but also stored in a network storage device or storage means in any appropriate form.

The computing system/server 105 may further include other removable/non-removable and volatile/non-volatile storage media. Although not shown in FIG. 1, there may be provided magnetic disk drivers for reading from or writing to removable and non-volatile magnetic disk and optical disk drivers for reading from or writing to removable and non-volatile optical disks. In these cases, each driver may be connected to a bus (not shown) by one or more data media interfaces. The memory 120 may include one or more program products 122, with one or more program module sets, which program modules are configured to perform functions of various embodiments described herein.

The communication unit 140 enables communication over a communication medium to another computing device. Additionally, functionality of the components of the computing system/server 105 may be implemented in a single computing cluster or in multiple computing machines that are able to communicate over communication connections. Thus, the computing system/server 105 may operate in a networked environment using logical connections to one or more other servers, network personal computers (PCs), or another common network node.

The input device 150 may be one or more of different input devices, such as a mouse, a keyboard, a trackball, a voice input device, and so on. The output device 160 may be one or more output devices, such as a display, speaker, printer, and so on. The computing system/server 105 may further communicate over the communication unit 140 with one or more external devices (not shown), such as storage devices, display devices, and so on, communicate with one or more devices causing users to interact with the computing system/server 105, or communicate with any device (e.g., a network card, a modem, and so on.) causing the computing system/server 105 to interact with one or more computing devices. Such communication may be executed via an input/output (I/O) interface (not shown).

As shown in FIG. 1, the storage device 130 has data 170 stored therein, which includes a dataset 172 (e.g., statistical data about yearly shark attacks on humans. The computing system/server 105 may receive via the input device 150 a data analysis request 102 which is inputted by the user 101 with respect to the dataset 172, determine heuristic information 103 for leading the conversation based on the data analysis request 102, and provide heuristic information 103 to the user 101 via the output device 160, so as to lead the user 101 to provide supplementary information associated with the data analysis request. Then, the computing system/server 105 may complete the data analysis procedure based on the supplementary information and obtain a data analysis result 180 that satisfies the user's needs. Logically, the data analysis result 180 may be presented in the form of graphics, table, text, audio, video or any combination thereof. It should be understood that the data analysis result 180 may be presented in any appropriate form, and the above forms are merely exemplary and not intended to limit the scope of the subject matter described herein.

The embodiments of the subject matter described herein will be further described by means of concrete examples. FIG. 2 shows a schematic diagram of a dataset 200 for data analysis according to an embodiment of the subject matter described herein. Although in FIG. 2 dataset 200 is shown in the form of a multidimensional table, it should be understood that the dataset 200 may take any appropriate form and the example in FIG. 2 is not intended to limit the scope of the subject matter described herein. The dataset 200 may be implemented as the dataset 172 in the data analysis device 105 of FIG. 1.

In some embodiments, the dataset 200 may be a single table stored in database, a Comma Separated Value (CSV) file or a file in any appropriate form, or it may be joined from multiple tables. As shown in the example of FIG. 2, dataset 200 is a table containing the shark attack records around the world, with multiple rows and columns. Each record is a row in the table, and columns "Country" 210, "Gender" 220, "Fatality" 230, "Activity" 240, "Attacks" 250 and "Year" 260 are dimensions of the data. A data model may be built in advance for dataset 200, and may include one or more content items and one or more operations associated with these content items. The content items may include dimensions of the data, as well as other content items that are determined from these content items according to predefined algorithms.

Data analysis tasks with regard to dataset 200 may include various On-Line Analytical Processing (OLAP), such as aggregation, slicing and dicing, drill-down, roll-up, and so on. In addition, data analysis tasks may further include mining of patterns, such as trends, outliers, correlations, and so on. A complex data analysis task may involve multiple subtasks. A data analysis request is translated, based on its semantics, to an operation corresponding to a query language (e.g., SQL, DAX, and MDX), and a data analysis task may perform such an operation to dataset 200 to obtain a result for the data analysis request.

Figure 3:
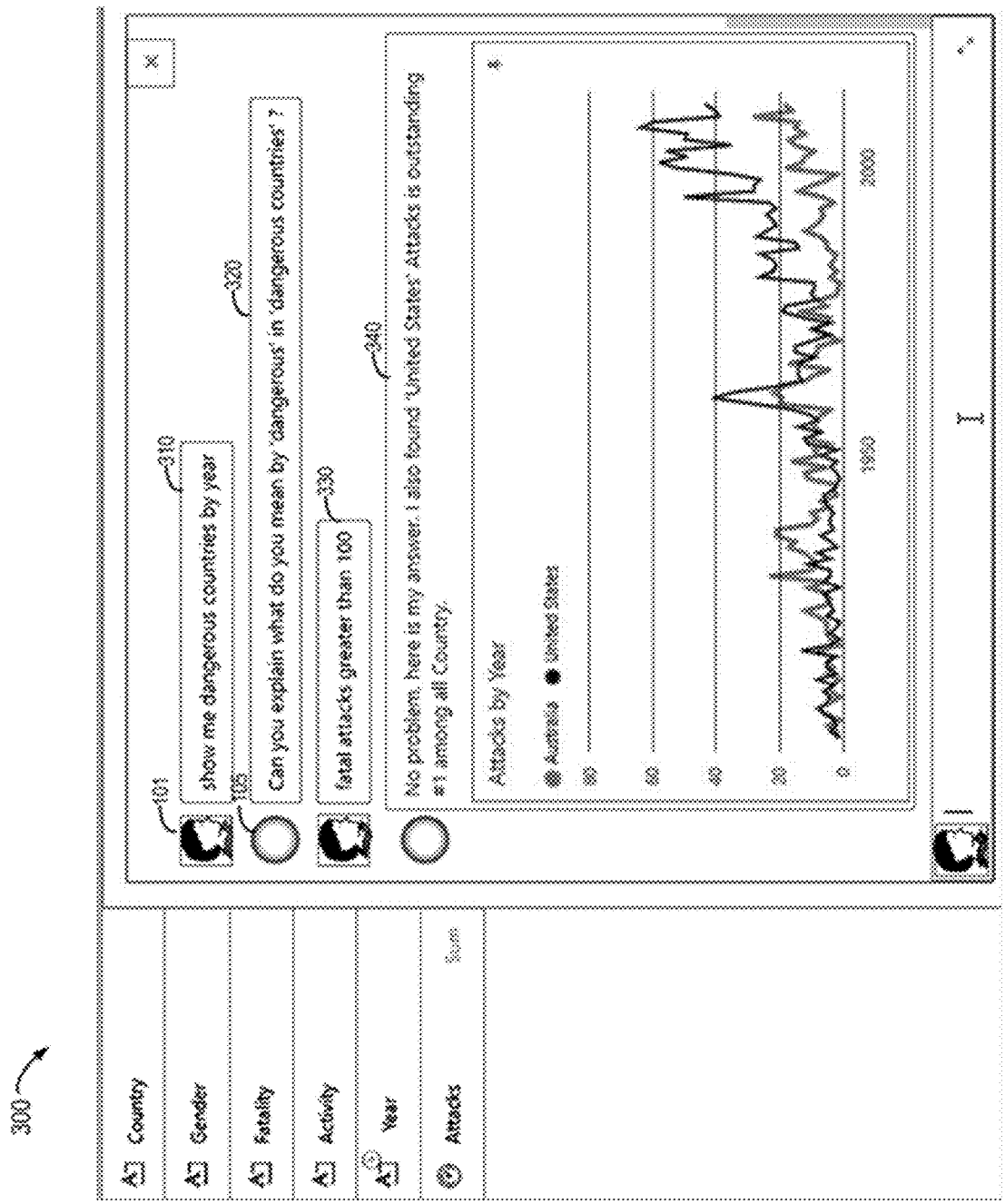
FIG. 3 shows a schematic diagram 300 of performing a data analysis to dataset 200 according to an embodiment of the subject matter described herein.

According to some embodiments of the subject matter described herein, the data analysis device 105 may receive from the user 101 a data analysis request 102 in various forms. Such a data analysis request may be a simple short sentence, or a complex sentence, such as a combination of multiple simple sentences or a long sentence with many limitations. FIG. 3 shows a schematic diagram 300 of data analysis of dataset 200 according to an embodiment of the subject matter described herein. In the embodiment shown in FIG. 3, the data analysis request 102 inputted by the user 101 is "show me dangerous countries by year." After receiving data analysis request 102, data analysis device 105 recognizes one or more content items therefrom, such as "year," "dangerous," "countries," and so on.

Next, the data analysis device 105 compares the recognized content items with the data model built in advance for dataset 200, thereby determining operations associated with the recognized content items. In this embodiment, operations associated with the two content items "year" and "countries," have been defined in the data model, but no corresponding operation has been defined for the content item "dangerous." Therefore, the data analysis device 105 cannot determine an operation associated with the content item "dangerous." It is to be understood that such uncertainty is not caused by ambiguous meaning of the word "dangerous," but referring to that it is unable to determine what operation should be performed to the dataset based on this word.

In this case, the data analysis device 105 may generate a question concerning the data analysis request 102, for example, "Can you explain what do you mean by 'dangerous' in 'dangerous countries'?" Such a question is used for inspiring user 101 to provide clarifying information about the content item "dangerous," so as to lead a conversation between the user 101 and the data analysis device 105.

Upon receipt of above heuristic information 103, the user 101 may input clarifying information, for example, "fatal attacks greater than 100." The clarifying information further explains the meaning of the content item "dangerous." Thereby, according to the embodiment of the subject matter described herein, the data analysis conversation will not terminate or report errors just because operations corresponding to some items in the analysis request are uncertain. In contrast, the system will lead the data analysis conversation to proceed normally by inspiring the user to input clarifying information.

Since both "fatal" and "attacks" belong to content items already built in the data model, the data analysis device 105 may look up corresponding operations according to these content items and perform the found operations to dataset 200. In this embodiment, the data analysis device 105 determines that Australia and the United States are countries where fatal attacks are greater than 100, i.e., "dangerous countries" inputted by user 101. In addition, the data analysis device 105 gives a statistical graph of attacks in these two countries according to attacks by year, so that the user may further view related information.

With such a bi-directional conversation pattern, the data analysis device 105 may supplement the data analysis request 102 by asking the user 101 to provide clarifying information, thereby obtain a data analysis result that better satisfies the user's needs. In this manner, the possibility that the data analysis device 105 cannot obtain a data analysis result or obtains a wrong result is reduced, and user experience is improved significantly.

Figure 4A:
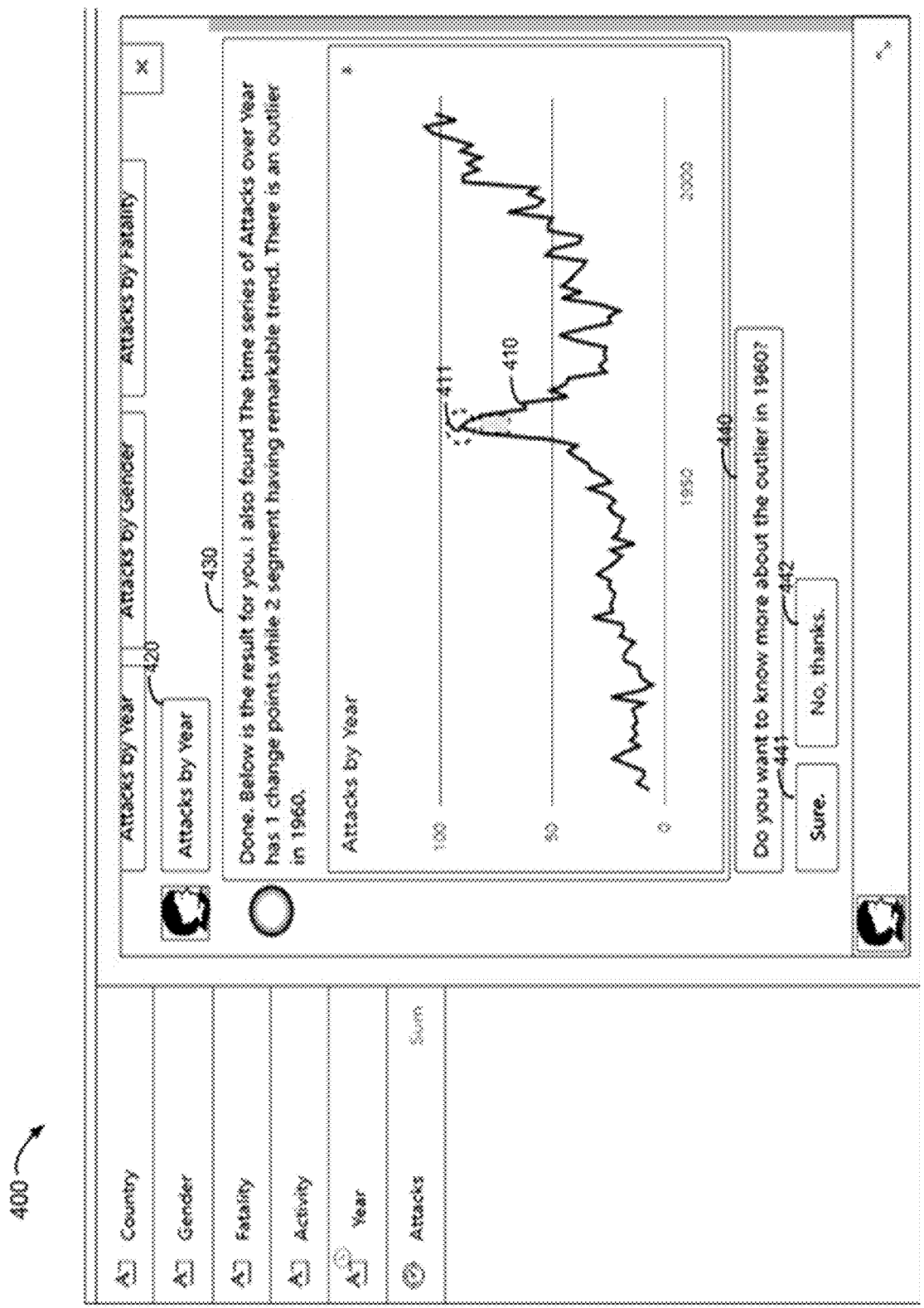
FIG. 4A shows a schematic diagram 400 of performing a data analysis to dataset 200 according to an embodiment of the subject matter described herein.

Besides inspiring the user to provide clarifying information or additionally, the data analysis device 105 may further provide to the user heuristic information that is extended for the data analysis result. FIG. 4A shows a schematic diagram 400 of data analysis of dataset 200 according to an embodiment of the subject matter described herein. In the embodiment shown in FIG. 4A, the data analysis request inputted by user 101 is "attacks by year." After receiving above data analysis request 102, the data analysis device 105 recognizes the content item "year" from the request and determines from the data model one or more operations associated with "year." By performing these operations, a curve 410 of attacks by year may be obtained. In addition, the data analysis device 105 further applies the data analysis result to one or more predefined operation templates, thereby making an extending analysis of an outlier 411 in curve 410, obtaining heuristic information as below: "do you want to know more about the outlier in 1960?" and providing a corresponding option "sure" or "no, thank."

According to the embodiment of the subject matter described herein, the predefined operation template may be a set of operation(s), which is built according to historical statistics, a profile or preferences of user 101, access records of multiple users, and so on. In some embodiment, the predefined operation template may be an analysis of outliers, analysis of data trends, analysis of highest or lowest data, and so on. It should be understood the above description of the predefined operation template is merely exemplary and is not intended to limit the scope of the subject matter described herein in any manner. Those skilled in the art would appreciate that the predefined operation template may be implemented in any appropriate form.

Figure 4B:
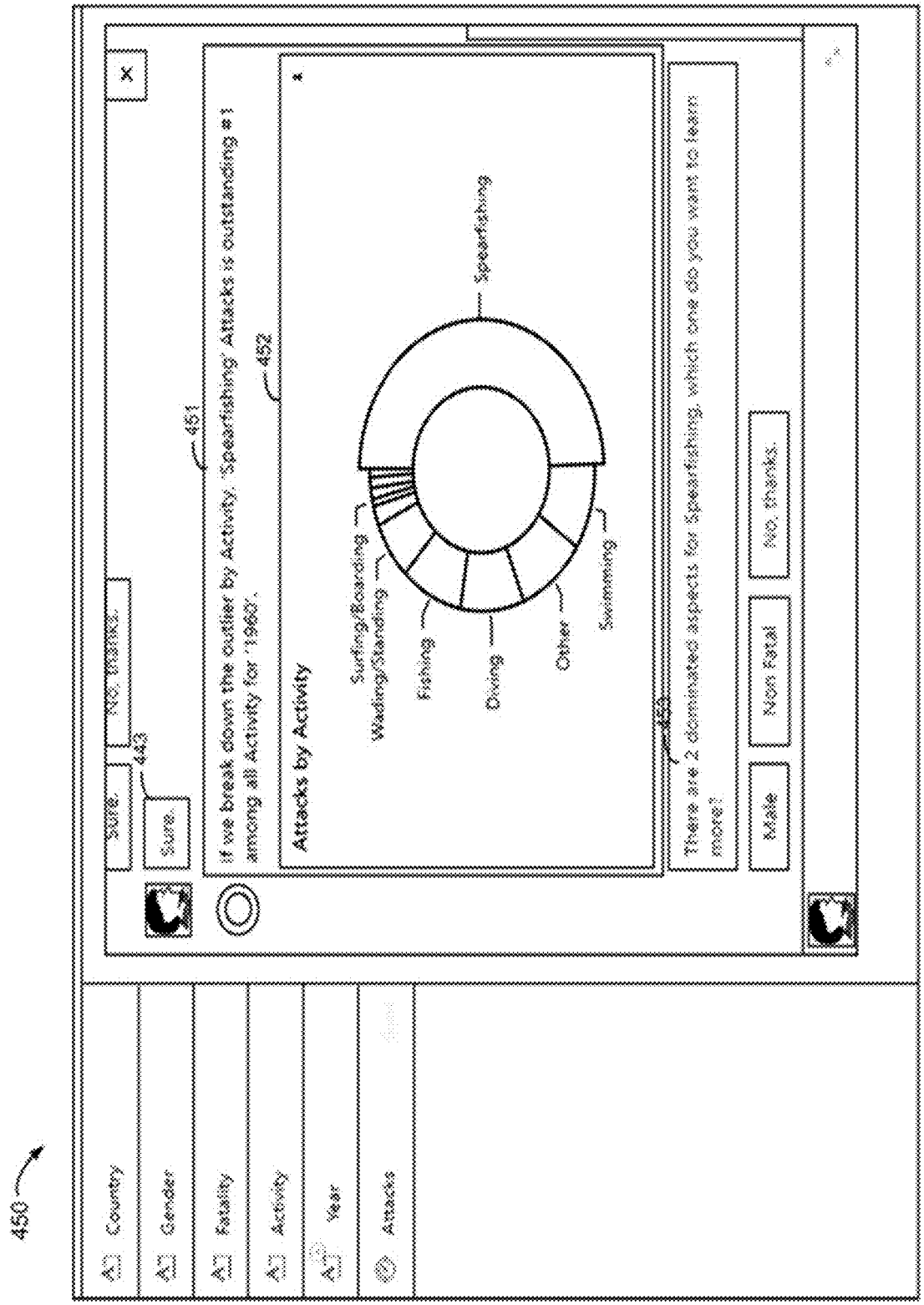
FIG. 4B shows a schematic diagram 450 of performing a bi-directional conversational data analysis based on heuristic information in FIG. 4A according to an embodiment of the subject matter described herein.

FIG. 4B shows a schematic diagram 450 of bi-directional conversation data analysis procedure based on the heuristic information of FIG. 4A according to an embodiment of the subject matter described herein. In the embodiment shown in FIG. 4B, user 101 inputs supplementary information according to the heuristic information provided by the data analysis device 105, for example, inputting "sure" or clicking the button of "sure." Upon receipt of the supplementary information, the data analysis device 105 obtains a corresponding data analysis result by means of the predefined operation template or according to an operation re-determined in the operation template according to the supplementary information inputted by the user.

Still with reference to the example in FIG. 2, the result includes text 451 "if the outlier is decomposed according to activities, attacks for "spearfishing" are outstanding first in among all activities in 1960," a graph 452, further heuristic information 453, i.e., "spearfishing has 2 main aspects, which one do you want to know?" as well as three buttons "Male," "Non Fatal" and "No, thanks." The user 101 may continue to provide supplementary information based on the further heuristic information 453, for example, choosing one option from the three buttons "Male," "Non Fatal" and "No, thanks," and further obtaining a corresponding data analysis result.

By means of the bi-directional conversational pattern, the data analysis device 105 may provide extension of the data analysis result by providing heuristic information to the user 101. Thereby, a data analysis result that is more likely to satisfy the user's further needs may be provided from multiple perspectives or multiple aspects. In this manner, it is efficiently increase the possibility that the user obtains a desired further data analysis result, and user experience is improved significantly.

Figure 5:
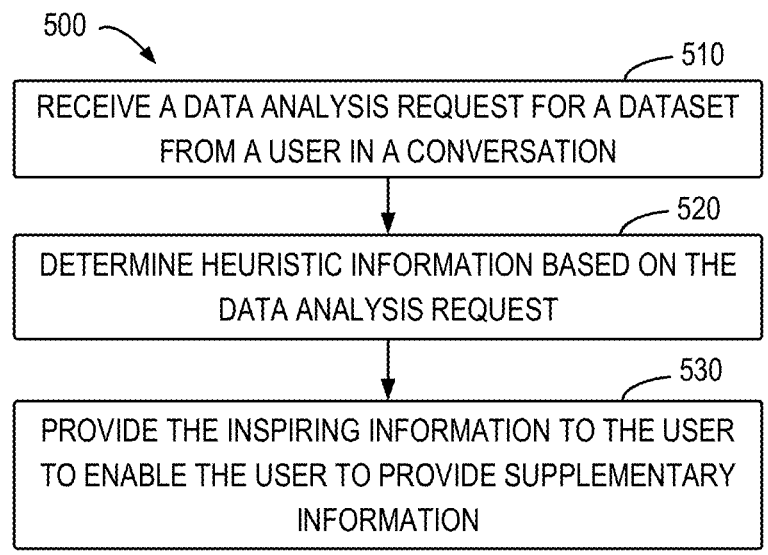
FIG. 5 shows a flowchart of a method 500 for data analysis according to an embodiment of the subject matter described herein.

A more detailed description is presented below to several exemplary embodiments of the bi-directional conversational data analysis method and device. FIG. 5 shows a flowchart of a method 500 for data analysis according to an embodiment of the subject matter described herein. It should be understood that the method 500 may be executed by the processing unit 110 as described with reference to FIG. 1.

At 510, a data analysis request from a user with respect to a dataset is received in a conversation. Take the embodiment in FIG. 1 as an example. The user 101 inputs a data analysis request 102 to the data analysis device 105, e.g., the input device 150 of the data analysis device 105. For example, the user 101 may input data analysis request 102 to a dialogue box in the form of text, voice or combination thereof, or may input the data analysis request 102 by clicking or touching a button, drop-down box, graphics, curve or words, or may input the data analysis request 102 by dragging a predefined control, graphics, words, and so on. It should be understood that these examples of inputting data analysis request 101 are merely for the discussion purpose, is not limiting, neither is intended to limit the scope of the subject matter described herein.

In some embodiments, when receiving from the user the data analysis request 102 in the form of text, voice or a combination thereof, the data analysis device 105 may save the data analysis request in a memory or predefined storage space for subsequent use. When detecting the user 101 clicks or touches the button, drop-down box, graphics, curve or words, the data analysis device 105 may determine one or more events associated with the clock or touch, and obtain information on the received data analysis request based on the events. When detecting the user 101 drags the predefined control, graphics, words, and so on, the data analysis device 105 may determine one or more events associated with the dragging, and obtain information on the received data analysis request based on the events.

At 520, heuristic information is determined based on the data analysis request. In the embodiment of the subject matter described herein, the heuristic information is information which is different from a result generated for the user's data analysis result and which is used for leading a conversation between the user and the data analysis device to prevent the conversation from being interrupted or reporting errors. For example, the heuristic information may lead the user to clarify some concepts in the inputted data analysis request, or provide the user with other extended information related to the data analysis result, and so on.

According to the embodiment of the subject matter described herein, the data analysis device 105 may determine the heuristic information in various manners. In some embodiments, the data analysis device 105 may extract content items from the data analysis request, such as words or phrases about location, time, date, event, brand, category, and so on. In some alternative embodiments, the data analysis device 105 may further determine, based on the extracted content items, a content item highly correlated to the extracted content items. Subsequently, the data analysis device 105 may determine whether at least one operation to be applied to a dataset can be determined based on the extracted content items and/or the determined content item.

For example, the data analysis device 105 may perform a linguistic analysis to the data analysis request, thereby determining the part of speech of a word or phrase in the data analysis request, such as "noun," "pronoun," "adverb" and so on, determining the modification role of the word or phrase, such as "adverbial," "attribute," "predicate" and so on, and/or determining other linguistic properties of the word or phrase. It should be understood that the linguistic analysis process may be implemented using conventional linguistic analysis algorithms (e.g., Part-Of-Speech (POS) tagging algorithm).

Optionally, the data analysis device 105 may further detect a context of the data analysis request. In this process, the data analysis device 105 may query contents inputted among a predefined number of sentences or within a predefined time period before the user inputs the data analysis request, to determine in which environment the data analysis request is submitted, to which content item a pronoun in the request refers, what contents are ignored in the request, and so on.

Next, the data analysis device 105 attempts to determine the at least one operation based on the above resultant content items, a linguistic analysis result, a context and a predefined data model. The predefined data model may include a content item and one or more operations associated with the content item. In one embodiment, each operation of the content item may be related to different linguistic patterns. In this case, the data analysis device 105 may determine a linguistic pattern of the content item according to the linguistic analysis result and the context, and further determine operations of the content item having the linguistic pattern.

In some embodiments, if no operation can be determined, then the data analysis device 105 may consider that the recognized content item has an incomprehensible meaning, and the user's clarification is needed. In this case, the data analysis device 105 may generate a question for the data analysis request based on the recognized content item, so as to inspire the user to provide clarifying information on the content item.

As an alternative solution, in other embodiments, if the data analysis device 105 can determine one or more operations based on the recognized content item, then the data analysis device 105 may determine a code segment for implementing the at least one operation, and determine the heuristic information based on the code segment. According to the embodiment of the subject matter described herein, the code segment is, for example, a program or a segment of codes for implementing operations associated with the content item. The content item may be, for example, an input or part of the input of the code segment, and may have different categories, purposes or usages. One code segment may include one or more operations executed in certain order. The code segment may be a program that is generated on demand, dynamically and/or automatically; or may be a predefined program stored in a specific memory. It should be understood that the code segment can be configured flexibly, may be implemented using any appropriate programming language or format, and is not intended to limit the scope of the subject matter described herein in any manner.

In some embodiments, if the data analysis device 105 determines a plurality of code segments based on the recognized content item, then it may rank the plurality of code segments. For example, the data analysis device 105 scores the code segments according to the linguistic analysis result for the data analysis request and/or the context information, and then ranks the code segments by scores. A code segment with a higher score means it is more likely to satisfy the user's data analysis needs. The data analysis device 105 may provide the user 101 with a data analysis result which is obtained according to the code segment with the highest score. In addition, the data analysis device 105 may provide an option corresponding to a code segment with a lower score or a result obtained according to such a code segment to the user 101 as heuristic information. Such heuristic information includes extended information for the data analysis result, thereby increasing the possibility of providing a data analysis result that satisfies user's needs.

According to some alternative embodiments of the subject matter described herein, the data analysis device 105 may further extend the data analysis request to determine heuristic information, based on a content item in the data analysis request, a result for the data analysis request, a predefined rule for extending the data analysis request, and so on. In some embodiments, the data analysis device 105 may determine other operations associated with the result for the data analysis request, for example, may extract a content item from the result and look up matching operations according to the data model built in advance. Then, the data analysis device 105 may obtain a code segment based on the determined operations, run the resultant code segment to obtain a result, so that the result can be subsequently provided to user 101 as heuristic information.

As an alternative, in other embodiments, the data analysis device 105 may further apply a content item in the data analysis request, a content item extracted from the result for the data analysis request and the like to the predefined rule, thereby obtaining one or more extended content items associated with existing content items. At this point, the data analysis device 105 may attempt to determine operations associated with the extended content item, obtain a corresponding code segment and further run the code segment to obtain an extended analysis result.

At 530, the heuristic information is provided to the user so as to enable the user to provide supplementary information associated with the data analysis request based on the heuristic information. In some embodiments, the data analysis device 105 may provide the extended analysis result as discussed above to the user as the heuristic information, for the user's choice.

In some alternative embodiments, the data analysis device 105 may also provide the user 101 with a tag of the code segment associated with the extended content item as the heuristic information, for example, presenting the tag to the user in the form of a serial number, keyword, and so on. Only when the user clicks or inputs the corresponding serial number of keyword, does the data analysis device 105 run the corresponding code segment to obtain an extended analysis result. In this manner, unnecessary system resource consumption can be reduced, and the running efficiency and speed can be increased.

In other alternative embodiments, at 530, the data analysis device 105 may provide a question, generated for the data analysis request based on the recognized content item, to the user as the heuristic information so as to inspire the user 101 to provide clarifying information about the content item.

According to the embodiment of the subject matter described herein, upon receipt of the heuristic information, the user 101 may provide supplementary information associated with the data analysis request. The supplementary information may be clarifying information for the question raised by the data analysis device 105 relating to the data analysis request, or may be selective information regarding whether to view extended analysis results and which extended analysis result to be viewed. Upon receipt of the supplementary information from the user, the data analysis device 105 may determine a data analysis result associated with the supplementary information and provide the determined data analysis result to the user. In this manner, the possibility that the user obtains a desired data analysis result can be increased efficiently, and user experience can be improved significantly.

According to the embodiment of the subject matter described here, the data analysis device 105 stores at least one of the data analysis request and/or the supplementary information as a user profile, so as to provide a related data analysis result based on the user profile later. The user profile may include the user's data analysis historical information and may reflect the user's habit of data analysis in an accurate way.

In some embodiments, even if the user does not submit any data analysis request, the data analysis device 105 may still automatically mine data in the dataset according to the user's profile and proactively provide the heuristic information to the user. In some alternative or additional embodiments, the data analysis device 105 may further obtain other user's profile and determine a data analysis policy based on the user's profile and/or other user's profile. For example, when most users want to obtain an outlier of data in a past time period, the data analysis policy may be, for example, "analyzing an outlier." It should be understood this is merely exemplary. In the embodiment of the subject matter described herein, the data analysis policy may further include an average result, extreme values or other information of analysis data, may also include priorities or an execution order of these analyses, and may further include any other appropriate analysis approach. Then, the data analysis device 105 may analyze data according to the determined data analysis policy, obtain heuristic information and provide it to the user. According to the heuristic information, the user may determine the data analysis result he/she wants to view. In this manner, it is helpful for the user to better understand data, and the data analysis conversation is guided effectively.

Figure 6:
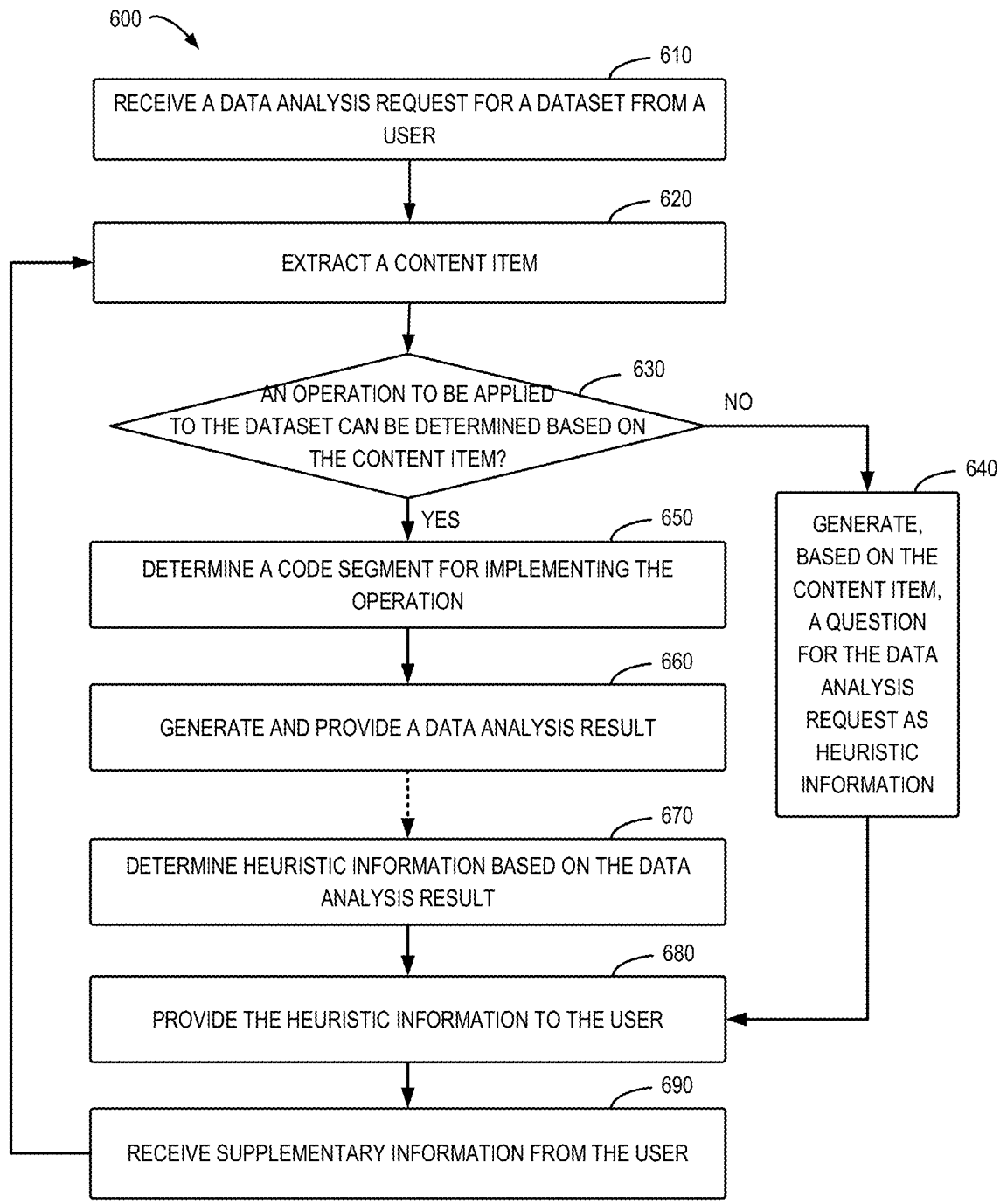
FIG. 6 shows a flowchart of a method 600 for data analysis according to an embodiment of the subject matter described herein.

Now with reference to FIG. 6, more detailed description is presented to a bi-directional conversational data analysis method according to an embodiment of the subject matter described herein. FIG. 6 shows a flowchart of a method 600 for data analysis. It should be understood that method 600 may be executed by the processing unit 110 as described with reference to FIG. 1, and may be considered as one concrete implementation of the method 500. Further it should be understood that method 600 is merely exemplary rather than limiting, and various operations in method 600 may be added or removed properly and may be executed in other appropriate order.

At 610, the data analysis device 105 receives from a user a data analysis request concerning a dataset. Still with reference to the embodiment as shown in FIG. 3, the data analysis request received by the data analysis device 105 from user 101 may be, for example, "show me dangerous countries by year," just as shown in 310. At 620, the data analysis device 105 extracts a content item from the data analysis request. Continue the embodiment in FIG. 3. Content items extracted by the data analysis device 105 from the data analysis request "show me dangerous countries by year" are, for example, "year," "dangerous" and "countries."

At 630, the data analysis device 105 determines whether operations to be applied to the dataset can be determined based on the content item. In the foregoing embodiment, since operations associated with the two content items "year" and "countries" are already defined in a data model, but no corresponding operation has been defined for the content item "dangerous," the data analysis device 105 fails to determine an operation associated with the content item "dangerous."

At 640, a question concerning the data analysis request is generated as heuristic information based on the content item. For example, the data analysis device 105 may generate a question concerning the data analysis request 102, for example, "Can you explain what do you mean by 'dangerous' in 'dangerous countries'?" At 680, the data analysis device 105 provides the heuristic information to the user by presenting the above question to the user, just as shown in 320 in FIG. 3.

At 690, supplementary information is received from the user. In the embodiment shown in FIG. 3, the user 101 inputs clarifying information as below: "fatal attacks greater than 100," just as shown in 330 to explain the meaning of the content item "dangerous." Then, method 600 proceeds to 620 where the data analysis device 105 extracts a content item from the user's supplementary information. For example, the data analysis device 105 may extract content items "fatal" and "attacks" from the supplementary information "fatal attacks greater than 100."

Then, at 630, the data analysis device 105 determines whether operations to be applied to the dataset can be determined based on the extracted content item. In this embodiment, suppose both "fatal" and "attacks" belong to content items in the built data model, at 640 the data analysis device 105 may determine, according to these content items, corresponding operations which are to be applied to the dataset 200. Then at 650, the data analysis device 105 determines a code segment for implementing the determined operations. At 660, the data analysis device 105 may generate a corresponding data analysis result by running the code segment and provide the result to the user 101.

It should be understood that the foregoing example is merely illustrative and not limiting. In other embodiments of the subject matter described herein, if the data analysis device 105 judges at 630 that still no operation to be applied to the dataset can be obtained according to the content item (e.g., "fatal" and "attacks") determined from the supplementary information, then the data analysis device 105 may continue to provide the heuristic information to the user 101 so that the user 101 can provide further clarifying information.

In other embodiments of the subject matter described herein, if the data analysis request received by the data analysis device 105 at 610 is as shown in 420 in FIG. 4A, i.e., "by year," then the data analysis device 105 identifies the content item "year" from the request at 620. Since the data model already stores operations associated with the content item "year," the data analysis device 105 judges at 630 that operations to be applied to the dataset can be determined based on the content item.

Next at 650, the data analysis device 105 determines a code segment used for implementing above operations. At 660, the data analysis device 105 may generate a corresponding data analysis result by running the code segment and provide the result to the user 101, as shown in 430.

In some embodiments, the data analysis device 105 may further determine the heuristic information based on the data analysis result. As shown by the embodiment in FIG. 6, after providing the data analysis result (i.e., a curve of attacks by year) to user 101 at 660, the data analysis device 105 may determine an extension analysis result based on the data analysis result, and provide the extension analysis result to the user 101 as heuristic information at 680. The heuristic information is, for example, "Do you want to know more about the outlier in 1960?", as shown in 440 in FIG. 4, and corresponding options 441 and 442.

At 690, the data analysis device 105 receives supplementary information from the user, e.g., "Sure" indicated by 443 in FIG. 4B. In some embodiments, through context analysis, the data analysis device 105 may determines the user inputted supplementary information as "want to know more about the outlier in 1960." Then at 620, the data analysis device 105 extracts content items from the supplementary information, such as "1960," "outlier," and so on.

At 630, the data analysis device 105 determines whether operations to be applied to the dataset can be determined based on the extracted content item. In this embodiment, since both "1960" and "outlier" belong to content items in the built data model, the data analysis device 105 may determine, according to these content items, corresponding operations and to be applied to dataset 200. Then at 650, the data analysis device 105 determines a code segment for implementing the determined operations. At 660, the data analysis device 105 may generate a corresponding data analysis result by running the code segment and provide the result to the user 101, as shown in 451 and 452.

It should be understood that the foregoing example is merely illustrative and not limiting. In other embodiments of the subject matter described herein, after providing the above data analysis result, the data analysis device 105 may further continue to provide heuristic information to the user 101, e.g., as shown in 453 in FIG. 4B, so that the user may view more relevant data analysis results.

Figure 7:
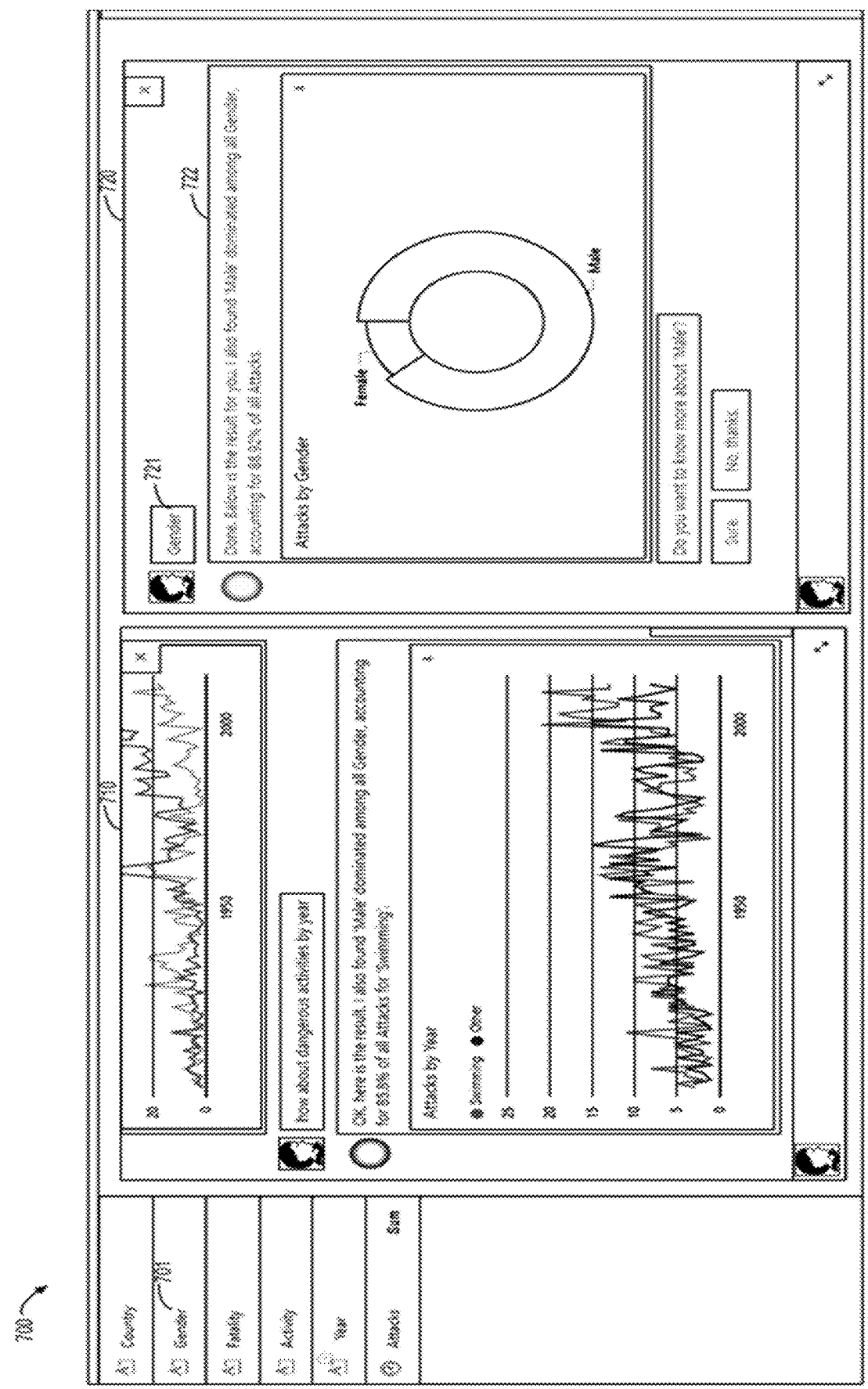
FIG. 7 shows a user interface 700 of multiple conversations according to an embodiment of the subject matter described herein.

According to the embodiment of the subject matter described herein, a user interface between the user 101 and the data analysis device 105 may include one or more conversations. In some embodiments, the conversation what is described above with reference to the embodiment in FIGS. 5 and 6 may be considered as a first conversation in the user interface. When receiving another data analysis request from the user 101, the data analysis device 105 may establish a second conversation which is different than the first conversation by dragging, and provide a data analysis result for the another data analysis request to the user in the second conversation. FIG. 7 shows a user interface 700 of multiple conversations according to an embodiment of the subject matter described herein. In the embodiment shown in FIG. 7, in the course of a first conversation 710, the user 101 creates a second conversation 720 by clicking or dragging a word or button "gender" (denoted by 701) in the left side of the user interface. In the second conversation, the data analysis device 105 may provide a result regarding the data analysis request "gender," just as shown in 722. In this manner, the user may simultaneously undertake multiple data analysis tasks in multiple conversations, thereby effectively increasing the work efficiency and facilitating usage.

According to a further embodiment of the subject matter described herein, options may be provided to the user in respective conversations so as to only present the portion related to the data analysis result. FIG. 8 shows a user interface 800 according to an embodiment of the subject matter described herein. In FIG. 8, the user makes only portions 810, 820 and 830 which are related to the data analysis result visible by clicking relevant buttons or controls in the user interface. The user may arrange views and scale dimensions by dragging portions 810, 820 and 830. At this point, portions related to the data analysis request, heuristic information and so on are invisible. In this manner, the user can conveniently obtain a desired data analysis result, for example, directly generate a report or a chart. Thereby, usage is facilitated to the user to some extent and user experience is improved.

According to an embodiment of the subject matter described herein, the data analysis device 105 may determine the user's preferences or interests by learning data analysis requests of user 101, thus establishing a user profile. The data analysis device 105 may further update and perfect the user profile in conversations with user 101, so as to better understand and analyze the user's needs and intention. For example, regarding dataset 200 of shark attack records, if the user 101 is prepared to write an analysis about Australian shark attacks, it is possible that the user does not want the data analysis about the United States but only the data analysis about Australia. In this case, the data analysis device 105 may consider that a code segment formed by various operations related to the content item Australia has a higher score. Thus, the data analysis device 105 is highly likely to provide to the user a data analysis result about Australia, which can better satisfy the user's needs.

The methods and functions described in this specification may at least partly executed by one or more hardware logic components, and illustrative types of usable hardware logical components include field programmable gate array (FPGA), application-specific standard product (ASSP), system on chip (SOC), complex programmable logic device (CPLD), and so on.

Program codes for carrying out methods of the subject matter described herein may be written in any combination of one or more programming languages. These computer program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

In the context of the subject matter described herein, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in this specification in the context of separate implementations may also be implemented in combination in a single implementation. Conversely, various features that are described in the context of a single implementation may also be implemented in multiple embodiments separately or in any suitable sub-combination.

Listed below are some example implementations of the subject matter described herein.

The embodiments of the subject matter described herein include a computer-implemented method. The method comprises: receiving, from a user, a data analysis request for a dataset in a conversation; determining, based on the data analysis request, heuristic information used for leading the conversation and differing from a result for the data analysis request; and providing the heuristic information to the user to enable the user to provide supplementary information associated with the data analysis request based on the heuristic information.

In some embodiments, the determining heuristic information comprises: extracting a content item from the data analysis request; determining whether at least one operation to be applied to the dataset is able to be determined based on the content item; and in response to determining that the at least one operation is unable to be determined based on the content item, generating a question for the data analysis request based on the content item, the question inspiring the user to provide clarifying information about the content item.

In some embodiments, the determining whether at least one operation to be applied to the dataset is able to be determined based on the content item comprises: performing a linguistic analysis to the data analysis request; detecting a context of the data analysis request; and attempting to determine the at least one operation based on the content item, a result of the linguistic analysis, the context and a predefined data model.

In some embodiments, the method may further comprise: in response to determining that the at least one operation is able to be determined based on the content item, determining a code segment for implementing the at least one operation; and determining the heuristic information based on the code segment.

In some embodiments, the determining heuristic information comprises: generating the heuristic information by extending the data analysis request based on at least one of: a content item in the data analysis request; a result for the data analysis request; and a predefined rule for extending the data analysis request.

In some embodiments, the method may further comprise: in response to receiving the supplementary information from the user, determining a data analysis request associated with the supplementary information; and providing the determined data analysis result to the user.

In some embodiments, the conversation is a first conversation in a user interface, and the method may further comprise: in response to receiving a further data analysis request from the user, establishing a second conversation different from the first conversation by dragging; and providing in the second conversation a data analysis result for the further data analysis request to the user.

In some embodiments, the method may further comprise: storing at least one of the data analysis request and the supplementary information as a user profile, to provide a related data analysis result based on the user profile.

The embodiments of the subject matter described herein include an electronic device, comprising: a processing unit; a memory, coupled to the processing unit and having instructions stored therein, the instructions, when executed by the processing unit, causing the device to: receiving, from a user, a data analysis request for a dataset in a conversation; determining, based on the data analysis request, heuristic information leading the conversation and differing from a result for the data analysis request; and providing the heuristic information to the user to enable the user to provide supplementary information associated with the data analysis request based on the heuristic information.

In some embodiments, the determining heuristic information may comprise: extracting a content item from the data analysis request; determining whether at least one operation to be applied to the dataset is able to be determined based on the content item; and in response to determining that the at least one operation is unable to be determined based on the content item, generating a question for the data analysis request based on the content item, the question inspiring the user to provide clarifying information about the content item.

In some embodiments, the determining whether at least one operation to be applied to the dataset is able to be determined based on the content item may comprise: performing a linguistic analysis to the data analysis request; detecting a context of the data analysis request; and attempting to determine the at least one operation based on the content item, a result of the linguistic analysis, the context and a predefined data model.

In some embodiments, the actions may further comprise: in response to determining that the at least one operation is able to be determined based on the content item, determining a code segment for implementing the at least one operation; and determining the heuristic information based on the code segment.

In some embodiments, the determining heuristic information may comprise: generating the heuristic information by extending the data analysis request based on at least one of: a content item in the data analysis request; a result for the data analysis request; and a predefined rule for extending the data analysis request.

In some embodiments, the actions may further comprise: in response to receiving the supplementary information from the user, determining a data analysis request associated with the supplementary information; and providing the determined data analysis result to the user.

In some embodiments, the conversation is a first conversation in a user interface, and the actions may further comprise: in response to receiving a further data analysis request from the user, establishing a second conversation different from the first conversation by dragging; and providing, in the second conversation, a data analysis result for the further data analysis request to the user.

In some embodiments, the actions may further comprise: storing at least one of the data analysis request and the supplementary information as a user profile, to provide a related data analysis result based on the user profile.

The embodiments of the subject matter described herein further provide a computer program product stored in a non-transient storage medium and including machine executable instructions which, when running on a device, cause the device to: receive, from a user, a data analysis request for a dataset in a conversation; determine, based on the data analysis request, heuristic information leading the conversation and differing from a result for the data analysis request; and provide the heuristic information to the user to enable the user to provide supplementary information associated with the data analysis request based on the heuristic information.

In some embodiments, the machine executable instructions, when running on a device, further cause the device to: extract a content item from the data analysis request; determine whether at least one operation to be applied to the dataset is able to be determined based on the content item; and in response to determining that the at least one operation is unable to be determined based on the content item, generate a question for the data analysis request based on the content item, the question inspiring the user to provide clarifying information about the content item.

In some embodiments, the machine executable instructions, when running on a device, further cause the device to: perform a linguistic analysis to the data analysis request; detect a context of the data analysis request; and attempt to determine the at least one operation based on the content item, a result of the linguistic analysis, the context and a predefined data model.

In some embodiments, the machine executable instructions, when running on a device, further cause the device to: in response to determining that the at least one operation is able to be determined based on the content item, determine a code segment for implementing the at least one operation; and determine the heuristic information based on the code segment.

In some embodiments, the machine executable instructions, when running on a device, further cause the device to: generate the heuristic information by extending the data analysis request based on at least one of: a content item in the data analysis request; a result for the data analysis request; and a predefined rule for extending the data analysis request.

In some embodiments, the machine executable instructions, when running on a device, further cause the device to: in response to receiving the supplementary information from the user, determine a data analysis request associated with the supplementary information; and provide the determined data analysis result to the user.

In some embodiments, the conversation is a first conversation in a user interface, and the machine executable instructions, when running on a device, further cause the device to: in response to receiving a further data analysis request from the user, establish a second conversation different from the first conversation by dragging; and provide, in the second conversation, a data analysis result for the further data analysis request to the user.

In some embodiments, the machine executable instructions, when running on a device, further cause the device to: store at least one of the data analysis request and the supplementary information as a user profile, to provide a related data analysis result based on the user profile.

Although the subject matter described herein has been described in a language specific to structural features and/or method logic actions, it should be appreciated that the subject matter as defined in the appended claims is not limited to the specific features or actions described above. On the contrary, the specific features and actions described above are merely example forms for implementing the claims.

The invention claimed is:

1. A system comprising:
  a processor; and
  a memory coupled to the processor and having instructions that, when executed by the processor, perform operations comprising:
    receiving a data analysis request from a user;
    generating heuristic information prompting the user to provide clarifying information for a content item in the data analysis request;
    in response to providing the heuristic information to the user, receiving supplementary information from the user;
    determining a data analysis result associated with the supplementary information;
    generating an extended data analysis result by extending the data analysis result based on at least of:
      a content item in the data analysis result;
      a result for the data analysis result; or
      a predefined operation template; and
    providing the extended data analysis result to the user.

2. The system of claim 1, wherein receiving the data analysis request from the user comprises:
  receiving, by a data analysis device, the data analysis request from the user during a bi-directional conversation between the user and the data analysis device.

3. The system of claim 2, wherein:
  during the bi-directional conversation between the user and the data analysis device, the user and the data analysis device engage in speech-based exchanges.

4. The system of claim 2, wherein the data analysis request is in the form of text that is input into a dialogue box provided by the data analysis device.

5. The system of claim 1, wherein the heuristic information is different from the data analysis result.

6. The system of claim 1, wherein the content item in the data analysis request corresponds to a word or a phrase relating to at least one of a location, a time, a date, an event, a brand, or a category.

7. The system of claim 1, wherein receiving the data analysis request comprises:
  determining a dataset associated with the data analysis request;
  extracting the content item in the data analysis request from the data analysis request; and
  determining whether an operation to be applied to the dataset is determinable based on the content item in the data analysis request.

8. The system of claim 7, wherein determining whether an operation to be applied to the dataset is determinable based on the content item in the data analysis request comprises:
  linguistically analyzing the data analysis request to determine a part of speech of the content item in the data analysis request.

9. The system of claim 7, wherein determining whether an operation to be applied to the dataset is determinable based on the content item in the data analysis request comprises:
  detecting a context of the data analysis request by analyzing a predefined number of sentences provided by the user prior to the data analysis request.

10. The system of claim 7, wherein determining whether an operation to be applied to the dataset is determinable based on the content item in the data analysis request comprises:
  detecting a context of the data analysis request by analyzing a number of sentences provided by the user within a predefined time period prior to the data analysis request.

11. The system of claim 7, wherein:
  generating the heuristic information occurs in response to determining the operation to be applied to the dataset is not determinable.

12. A method comprising:
  receiving, by a data analysis device, a data analysis request from a user;
  generating heuristic information prompting the user to provide clarifying information for a content item in the data analysis request;
  in response to providing the heuristic information to the user, receiving supplementary information from the user;
  determining a data analysis result associated with the supplementary information;
  generating an extended data analysis result by extending the data analysis result based on at least of:
    a content item in the data analysis result;
    a result for the data analysis result; or
    a predefined operation template; and
  providing the extended data analysis result to the user.

13. The method of claim 12, wherein the data analysis request is provided as speech to the data analysis device as part of a conversation between the user and the data analysis device.

14. The method of claim 12, wherein the clarifying information for the content item in the data analysis request corresponds to a definition for the content item in the data analysis request.

15. The method of claim 12, wherein receiving the data analysis request from the user comprises:
    identifying the content item in the data analysis request; and
    based on the content item in the data analysis request, determining whether an operation can be applied to a dataset associated with the data analysis request.

16. The method of claim 15, wherein determining whether the operation can be applied to the dataset comprises:
    determining whether a data model built for the dataset comprises the content item in the data analysis request and the operation, the operation being associated with the content item in the data analysis request in the data model.

17. The method of claim 15, the method further comprising:
    in response to determining the operation can be applied to the dataset, executing the operation to generate the data analysis result.

18. The method of claim 12, wherein the predefined operation template is generated based on at least one of:
    a profile of the user; or
    access records of multiple users.

19. The method of claim 12, wherein the predefined operation template is at least one of:
    an analysis of outlying data; or
    an analysis of data trends.

20. A device comprising:
    memory comprising instructions that, when executed, perform operations comprising:
        receiving, from a user, a data analysis request for a dataset;
        generating heuristic information prompting the user to provide supplementary information for a term in the data analysis request;
        in response to providing the heuristic information to the user, receiving the supplementary information from the user;
        determining a data analysis result associated with the supplementary information;
        generating an extended data analysis result by extending the data analysis result based on at least of:
            a content item in the data analysis result;
            a result for the data analysis result; or
            a predefined operation template; and
        providing the extended data analysis result to the user.

* * * * *